United States Patent [19]

Korenek

[11] Patent Number: 4,658,518

[45] Date of Patent: Apr. 21, 1987

[54] TREE MOVING APPARATUS

[76] Inventor: Albert H. Korenek, P.O. Box 45915, Houston, Tex. 77045

[21] Appl. No.: 572,395

[22] Filed: Jan. 20, 1984

[51] Int. Cl.⁴ ............................................. A01B 13/00
[52] U.S. Cl. ........................................ 37/2 R; 83/928; 47/76
[58] Field of Search .............. 37/2 R; 83/928; 111/2; 47/76

[56] References Cited

U.S. PATENT DOCUMENTS

| | | | |
|---|---|---|---|
| 3,017,707 | 1/1962 | Sigler et al. | 37/2 R |
| 3,017,708 | 1/1962 | Gardner | 37/2 R |
| 4,031,637 | 6/1977 | Stocker | 37/2 R |
| 4,226,033 | 10/1980 | Dehaan | 37/2 R |
| 4,286,398 | 9/1981 | Lemond et al. | 37/2 R |
| 4,301,605 | 11/1981 | Newman | 37/2 R |
| 4,341,025 | 7/1982 | Stocker | 37/2 R |
| 4,403,427 | 9/1983 | Dahlquist | 37/2 R |

*Primary Examiner*—E. H. Eickholt
*Attorney, Agent, or Firm*—Vaden, Eickenroht, Thompson & Boulware

[57] ABSTRACT

Apparatus for moving a tree is disclosed that includes a plurality of ground piercing blades, means for moving the blades into the ground below a tree to sever the tree and a root ball from ground, and guide means for guiding the blades into position under the tree to sever the tree and to support the tree and the root ball as the tree is moved to another location.

5 Claims, 8 Drawing Figures

FIG. 5
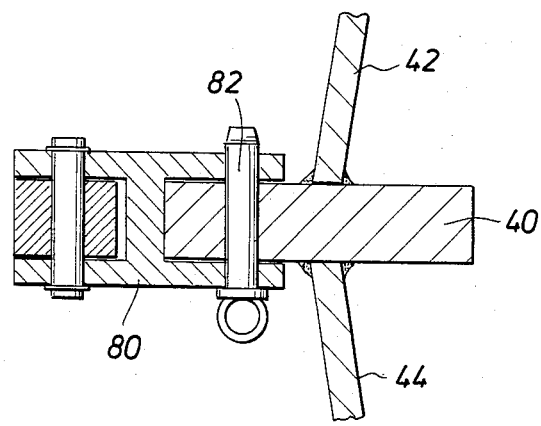
FIG. 3
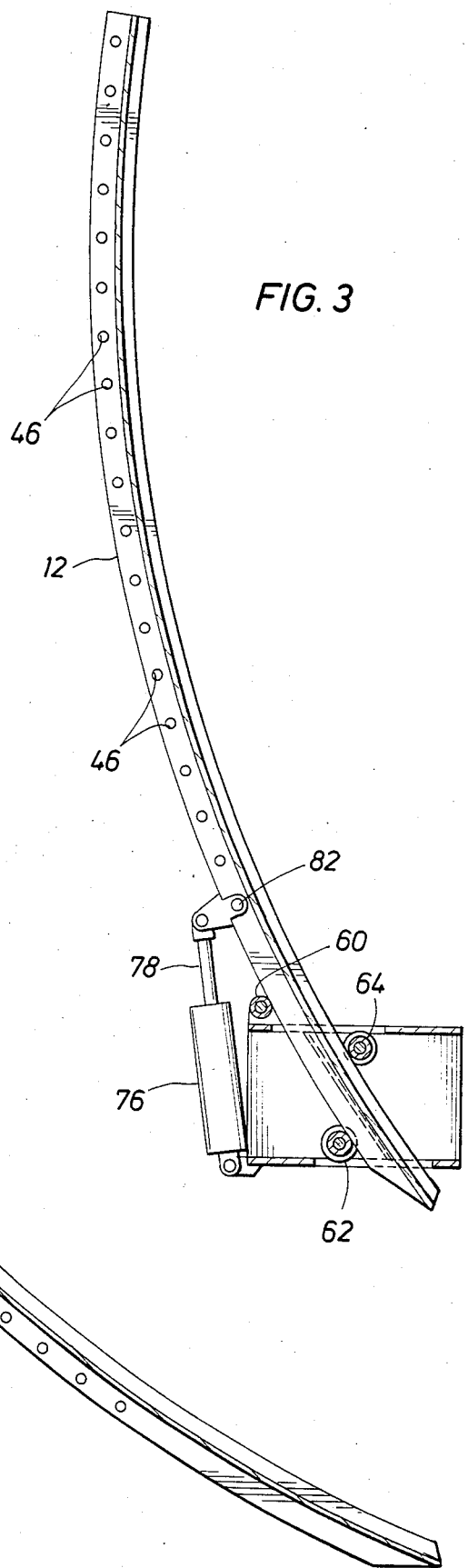
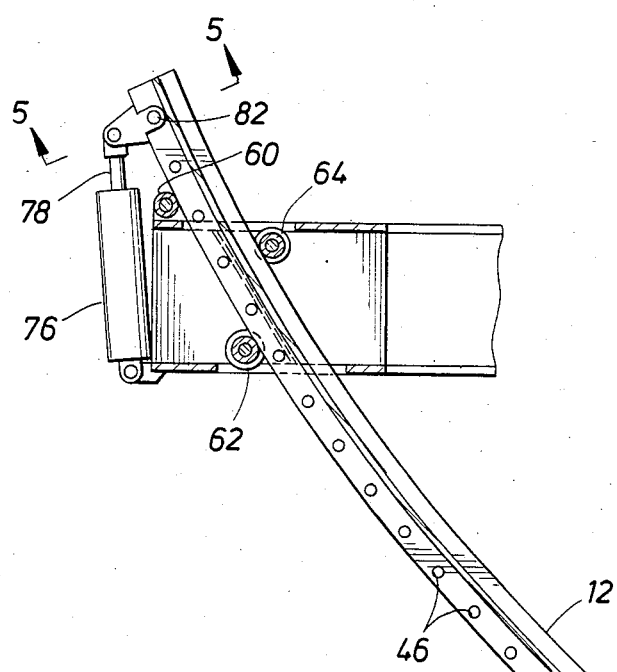
FIG. 4

TREE MOVING APPARATUS

This invention relates to apparatus for moving trees and other plants and, in particular, to such apparatus for moving relatively large trees and plants.

Land developers are becoming more interested in trying to save the trees on the land they are developing. In fact, some communities, such as Austin, Tex., have an ordinance protecting trees 19 inches in diameter or larger. Since such trees are usually in the way of the planned construction, they must be moved to another location on the site or elsewhere. For the trees to have a reasonable chance of surviving, a substantial root ball must be moved with the tree.

Therefore, it is an object of this invention to provide apparatus for moving large trees and an adequate root ball to give the tree a reasonable chance of survival.

As in previous tree moving equipment, this invention employs a plurality of blades that sever the root ball from the ground and form a supporting structure for the root ball and the tree as it is lifted out of the ground and moved to its new location. In the previous equipment, the blades were guided into the ground by various types of guide members that engaged the blades over a substantial portion of their length. This resulted in a lot of structure high above the ground. In the apparatus of this invention, the blades are guided into position below the tree by guide means located close to the ground.

Also, previously the blades were moved into the ground by hydraulic cylinders or the like that were required to have a stroke at least equal to half the stroke of the blades. In the apparatus of this invention, the blades are moved into and out of the ground by hydraulic cylinders that have a relatively short stroke, as compared to the stroke of the blades. This reduces substantially the distance the apparatus any structure, other than the withdrawn blades themselves, to extend far above the ground.

These and other objects, advantages, and features of this invention will be apparent to those skilled in the art from a consideration of this specification, including the attached drawings and appended claims.

In the drawings:

FIG. 3 is a vertical sectional view taken along line 3—3 of FIG. 2, but with the blade in the up position rather than the down position shown in FIG. 2;

FIG. 4 is a view similar to FIG. 3 but here the blade is in its down position;

FIG. 5 is a sectional view taken along line 5—5 of FIG. 4;

Figure 1:
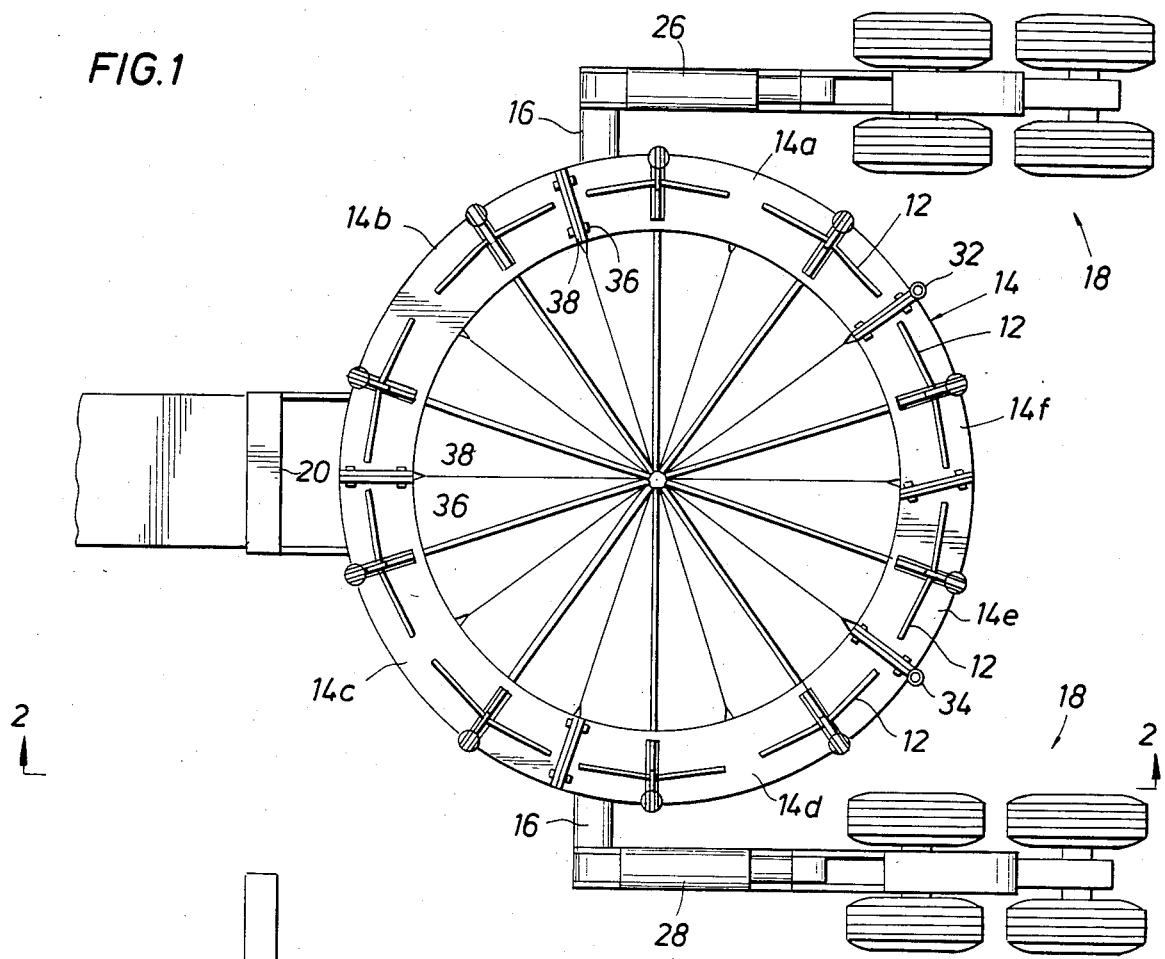
FIG. 1 is a top view of the apparatus of this invention with the blades in the position they would be when the apparatus is supporting a root ball and a tree above the ground for movement to another location, the root ball and the tree are not shown in the drawings.

In the embodiment shown in the drawings, the apparatus includes ten earth piercing blades 12 all supported on annular base 14. Base 14 in turn is supported by shafts 16 that extend outwardly from both sides of the base. The shafts are supported by four-wheel dollies 18 located on opposite sides of the base. The front end of base 14 is connected to U-shaped member 20 and moves up and down on rods 22 that extend into the hollow legs of the U-shaped support member with the weight of the front end of the base being transferred to the fifth wheel of tractor 24 through a hydraulic cylinder (not shown in the drawings.) This hydraulic cylinder combined with hydraulic cylinders 26 and 28 raise and lower base 14 relative to the ground.

Base 14 is made up of four sections 14a, 14b, 14c, and 14d, each of which support two blades. Sections 14e and 14f at the rear of the base each support only one blade and are connected to adjacent sections of the base by hinges 32 and 34. Normally, all of the sections are connected together by bolts 36 extending through connecting plates 38 attached to each end of the sections. To position the apparatus around a tree, rear sections 14e and 14f are disconnected fron each other and from the adjacent sections after which they are supported entirely by hinges 32 and 34. These sections then are swung on their hinges outwardly to provide an opening through which the trunk of the tree can move into the middle of the annular base. Afterwards, sections 14e and 14f are bolted together again and to their adjacent base sections because hinges 32 and 34 are not designed to take the stresses imposed on the base when it is carrying a root ball and a tree. The same procedure is used to remove the apparatus from a tree after it has been placed in its new location.

Figure 8:
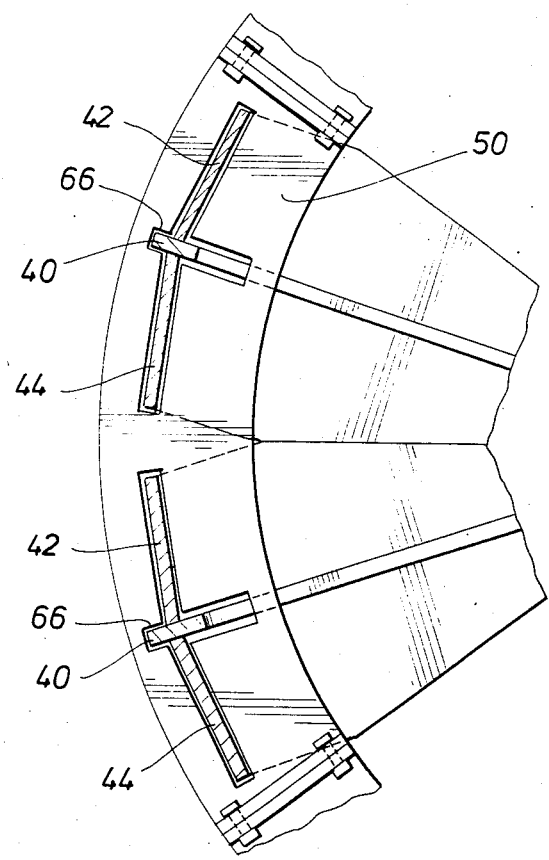
FIG. 8 is a view taken along line 8—8 of FIG. 6.

As best seen in FIGS. 3 and 4, blades 12 are curved in the vertical plane and in accordance with this invention, guide means are provided to guide the blades along the same curved path as they move into the ground beneath the tree. In the embodiment shown, each of blades 12 include center plate 40 to which is attached laterally extending blade members 42 and 44 as shown in FIG. 5 and FIG. 8. The blade members have downwardly tapered edges that engage adjacent blades when they are in position below a root ball to provide substantially solid support for the root ball.

Center plate 40 projects from both sides of blade members 42 and 44 and provides a "keel" type structure that, as will be seen below, combines with the guide means to hold the blade against lateral movement as it is moved into the ground. Center plate or keel 40 is provided with a plurality of longitudinally spaced holes 46 that are used in moving the blade into and out of the ground.

In the embodiment shown, guide means are provided for each blade. Such means include a pair vertically spaced guide members mounted on the annular base to engage one side on the blade and another guide member mounted on the base to engage the blade on the other side to force the blades to follow a curved path having the same radius of curvature as the blades. In the embodiment shown, base 14 includes vertically spaced horizontal annular plates 50 and 52 that are connected together by a plurality of vertically spaced connecting plates 54. As shown in FIG. 8, each plate is provided with slots through which the blades extend. The slots are designed to allow blades 12 to move relative to the plates as the blades are moved into and out of the ground.

Figure 7:
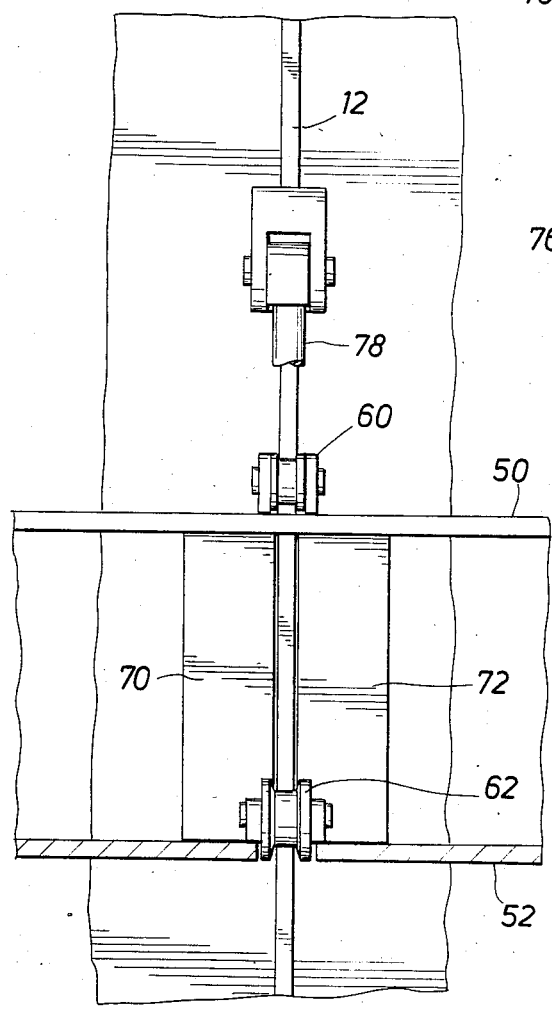
FIG. 7 is a view taken along line 7—7 of FIG. 6.
Figure 6:
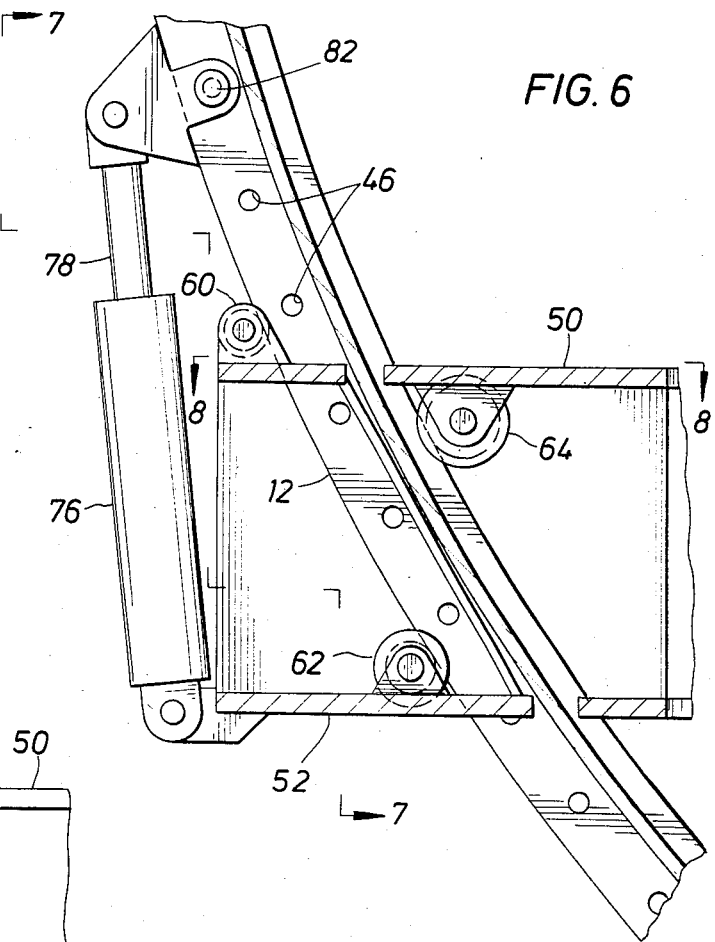
FIG. 6 is a view similar to FIG. 3, but on an enlarged scale.

In this embodiment, the two spaced guide members comprise rollers 60 and 62 mounted on plates 50 and 52 respectively of the base, as shown in FIG. 6 and also FIGS. 3, 4, and 7. Roller 64 is mounted on the underside of plate 50, again as shown in FIGS. 3, 4, and 6 and engages the center plate on the side of the blade facing the tree. All of the rollers are provided with grooves to receive the center plate to hold the rollers in position on the keel, but preferably, the rollers do not provide any restriction to lateral movement of the blade. This is provided by the engagement of center plate 40 in portion 66 of the slots in the the upper and lower flanges of the base. In addition, as shown in FIG. 7, lateral thrust plates 70 and 72 extend between upper flange 50 and lower flange 52 of the base along both sides of keel 40 to provide additional lateral support to the blade as it is moved into the ground.

Figure 2:
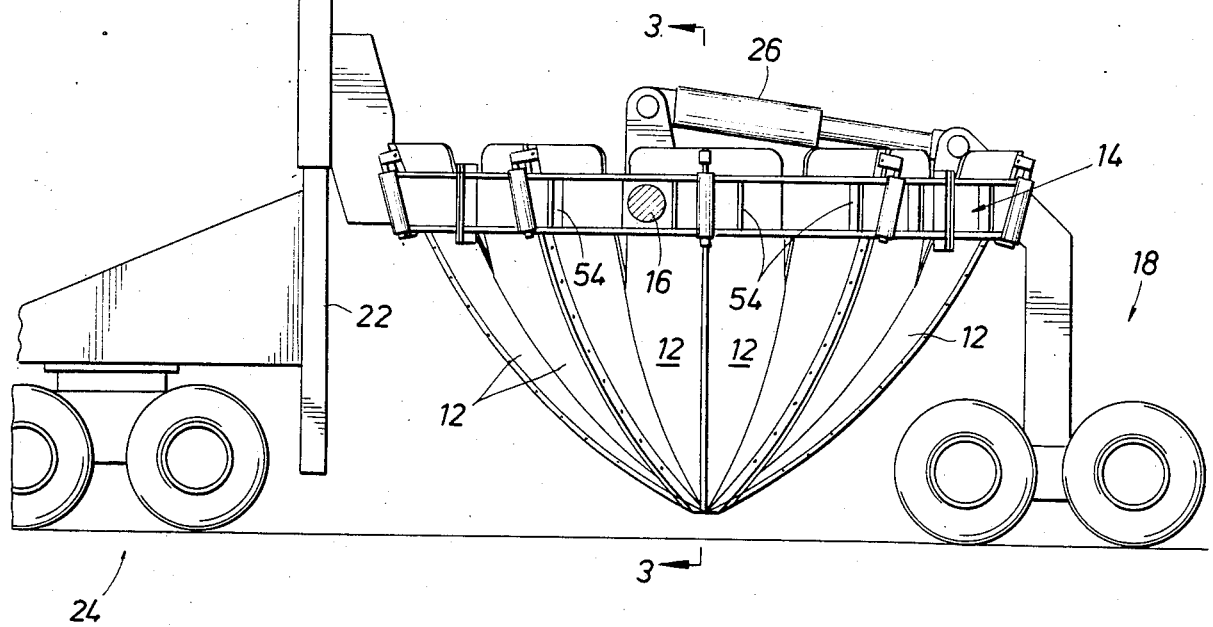
FIG. 2 is a side view taken in the direction of arrows 2—2 of the apparatus of FIG. 1.

In the embodiment shown, the means for moving the blades relative to the base and into and out of the ground comprise a plurality of hydraulic cylinders 76, each of which has one end attached to lower flange 51 of the base in alignment with the center plate of one of the blades as shown in FIG. 2. Each piston rod 78 is connected to the center plate of the blade by clevis 80 and pin 82 extending through one of the holes in the center plate as shown in FIG. 5. Thus, to move the blade into the ground, the clevis is pinned to the keel, the hydraulic cylinder pulls down, forces the blade into the ground a short distance, the pin is removed, the rod extended, and the pin again connects the clevis to another hole in the keel and the blade is moved in a step by step manner into the ground. The same system is used to move the blades out from under the ball after the tree has been placed in its new location.

A commercial embodiment of this invention has been used to move trees up to 50″ in diameter. The ball the apparatus removes is 14′ in diameter and weighs approximately 50,000 lbs. Obviously the chances of survival of the tree 50″ in diameter is not as great as it would be for a tree 28″ to 30″ in diameter. Other factors enter into the picture, however, such as the type of tree, its general state of health, and the quality of the post transplant care.

From the foregoing it will be seen that this invention is one well adapted to attain all of the ends and objects hereinabove set forth, together with other advantages which are obvious and which are inherent to the apparatus and structure.

It will be understood that certain features and subcombinations are of utility and may be employed without reference to other features and subcombinations. This is contemplated by and is within the scope of the claims.

Because many possible embodiments may be made of the invention without departing from the scope thereof, it is to be understood that all matter herein set forth or shown in the accompanying drawings is to be interpreted as illustrative and not in a limiting sense.

What is claimed is:

1. Apparatus for excavating a tree and a root ball from the ground comprising a plurality of ground piercing blades, an annular base comprising vertically spaced plates for supporting the blades in a circle around the tree, said blades being curved along their longitudinal axes and tapered to move into lateral engagement under the tree to sever the tree and a root ball from the ground, and to support the tree and root ball as the annular base and the blades are raised to lift the tree and root ball from the ground, means for moving the blades into the ground, and means for guiding the blades into the ground along paths having the same radius of curvature as the blades, said guide means including a pair of vertically spaced guide members mounted on the annular base to engage one side of the blades and a guide member mounted on the base to engage the blades on the other side and hold the blades in engagement with the guide members on the other side to force the blades to follow said curved path, said guide means further including keels that extend along the sides of the blades away from the tree and guide members carried by the base and located on opposite sides of the keels to limit lateral movement of the blades relative to the base, and in which the means for moving each blade into the ground includes a plurality of holes spaced along the keels, a hydraulic cylinder having one end attached to the base, a piston rod, and pin means for attaching the piston rod to the keel to allow the cylinder to move the blade relative to the base in a step by step manner by moving the pin from keel hole to keel hole.

2. Apparatus for excavating a tree along with a root ball from the ground, comprising an annular base for positioning around the tree, a plurality of ground piercing blades for movement relative to the base along their longitudinal axes mounted on the base, means for moving the blades along their longitudinal axes into the ground below the tree, means on the base for guiding the blades into position below the tree to sever the tree and a root ball from the ground and to support the tree and root ball when the base and blades are moved to a position above the ground, said blades being substantially longer than the base is high and have keels that extend longitudinally along the sides of the blades away from the tree and said means for moving the blades into the ground comprises hydraulic cylinders having piston rods substantially shorter than the blades and means on the piston rods to attach the piston rods at successive points along the keels of the blades and move the blades in a step-by-step manner relative to the base.

3. The apparatus of claim 2 in which the means for attaching the piston rods to the keels includes a plurality of holes in the keels, a clevis connected to the rod, and a pin for connecting the clevis to successive holes in the keel.

4. The apparatus of claim 2 in which the base includes a pair of spaced horizontal plates and the means for guiding the plates includes a pair of vertically spaced guide members attached to the base to engage one side of each blade and a thread guide member attached to the base to engage the other side of the blade and hold the blade in engagement with the guide members on the other side.

5. The apparatus of claim 2 in which the guide means includes guide members attached to the base between the plates to engage the keels on the blades and limit lateral movement of the blades relative to the base.

* * * * *